United States Patent [19]

Woodall

[11] Patent Number: 5,446,828
[45] Date of Patent: Aug. 29, 1995

[54] NONLINEAR NEURAL NETWORK OSCILLATOR

[75] Inventor: Roger L. Woodall, Jewett City, Conn.

[73] Assignee: The United States of America as represented by the Secretary of the Navy, Washington, D.C.

[21] Appl. No.: 33,226

[22] Filed: Mar. 18, 1993

[51] Int. Cl.⁶ ............................................. G06F 15/18
[52] U.S. Cl. ........................................ 395/23; 395/22; 395/24
[58] Field of Search ......................... 395/21, 22, 23, 24

[56] References Cited

U.S. PATENT DOCUMENTS

| | | | |
|---|---|---|---|
| 4,637,402 | 1/1987 | Adelman | 128/746 |
| 4,906,865 | 3/1990 | Holler | 307/353 |
| 5,046,019 | 9/1991 | Basehore | 395/23 |
| 5,067,095 | 11/1991 | Peterson et al. | 395/24 |
| 5,159,660 | 10/1992 | Lu et al. | 395/22 |

OTHER PUBLICATIONS

Segmentation and Binding in an Oscillatory Neural Network D. Horn 8–14 Jul. 1991 IEEE.
A Neural Pattern Generator that Exhibits Frequency–Dependent In-Phase and Anti-Phase Oscillations M. Cohen et al. IEEE 7–11 Jun. 1992.
Memorizing Oscillatory Patterns in the Analog Neuron Net K. Doya IEEE 18–22 Jun. 1989.

*Primary Examiner*—Allen R. MacDonald
*Assistant Examiner*—Richemond Dorvil
*Attorney, Agent, or Firm*—Michael J. McGowan; Prithvi C. Lall; Michael F. Oglo

[57] ABSTRACT

A nonlinear oscillator (10) includes a neural network (12) having at least one output (12a) for outputting a one dimensional vector. The neural network includes a plurality of layers, including an input layer, an output layer, and at least one hidden layer. Each of the layers includes at least one processing element (PE) that is interconnected to processing elements of adjacent layers. The input layer has an input coupled to the at least one output and includes an analog delay line (14) having a plurality of taps each of which outputs a time-delayed sample of the one dimensional output vector. Each of the taps is connected to each one of the processing elements of the at least one hidden layer for providing a time-delayed sample of the one dimensional output vector thereto. The nonlinear oscillator further includes a feedback network (16) that is interposed between the output of the neural network and the input of the input layer for modifying a magnitude and/or a polarity of the one dimensional output vector prior to the sample of the one dimensional output vector being applied to the input of the analog delay line. The analog delay line is capable of being shifted in either a first or a second direction. Connection weights of the neural network are trained on a deterministic sequence of data from a chaotic source or may be a representation of a stochastic process, wherein each of the weights is randomly selected.

19 Claims, 12 Drawing Sheets

FEEDBACK 1.0000 @ L-DELAY LINE TAP ( 1)

FEEDBACK 1.0000 @ L-DELAY LINE TAP ( 1)

FEEDBACK 1.0000 @ L-DELAY LINE TAP ( 1)

FEEDBACK 0.5000 @ L-DELAY LINE TAP ( 1)

FEEDBACK 1.9000 @ L-DELAY LINE TAP ( 1)

FEEDBACK -1.9000 @ L-DELAY LINE TAP ( 1)

FEEDBACK 1.0000 @ R-DELAY LINE TAP (-14)

FEEDBACK  −0.6000 @ R-DELAY LINE TAP ( −1)

FEEDBACK  −0.6000 @ L-DELAY LINE TAP ( −1)

FEEDBACK  0.2000 @ L-DELAY LINE TAP ( 1)

FEEDBACK  −22.0000 @ L-DELAY LINE TAP ( 1)

FEEDBACK -44.0000 @ L-DELAY LINE TAP ( 1)

FEEDBACK 22.0000 @ L-DELAY LINE TAP ( 1)

FEEDBACK 0.1000 @ L-DELAY LINE TAP ( 1)

FEEDBACK 0.1000 @ L-DELAY LINE TAP ( 4)

FEEDBACK -0.1000 @ L-DELAY LINE TAP ( 25)

FEEDBACK 1.0000 @ L-DELAY LINE TAP ( 1)

FEEDBACK 0.0000 @ L-DELAY LINE TAP ( 1)

Bifurcation Map of the NNNO vs. Lambda (feedback)
Lambda Full Scale 44.00

FEEDBACK 44.0688 @ L-DELAY LINE TAP (1)

Bifurcation Map of the NNNO vs. Lambda (feedback)
Lambda Full Scale −5.00

FEEDBACK −5.0078 @ L-DELAY LINE TAP (1)

NONLINEAR NEURAL NETWORK OSCILLATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to nonlinear dynamic systems and, in particular, to nonlinear oscillators.

(2) Description of the Prior Art

Various configurations of nonlinear mechanical and electrical devices have been employed to produce nonlinear dynamic systems. Examples of nonlinear oscillators include those known as the Bubble Oscillator, Duffing Oscillator, van der Pol Oscillator, the Toda Oscillator, and also the Fiegnbaum and Henon strange attractor algorithms. However, these oscillators or algorithms do not require neural networks for their implementation.

A large amount of literature exists in the field of artificial neural networks, or "neural nets". As one example, reference is made to Volumes 1 and 2 of "Parallel Distributed Processing-Explorations in the Microstructure of Cognition" by David E. Rumelhart, James E. McClelland and the PDP Research Group, The MIT Press, Cambridge, Mass. (1986). Reference is also made to U.S. Pat. No. 4,897,811, "N-Dimensional Coulomb Neural Network Which Provides For Cumulative Learning of Internal Representations", issued Jan. 30, 1990 to C. L. Scofield. This patent references a number of publications that describe various learning algorithms for multi-layer neural networks. Reference is also made to U.S. Pat. No. 4,748,674.

It is thus one object of this invention to provide a nonlinear oscillator that employs a neural network to provide a source of deterministic signals.

It is a further object of this invention to provide a nonlinear neural network oscillator that receives m-dimensional input vectors, outputs an n-dimensional vector, that includes a network for possibly modifying one or more output vector elements to provide a feedback signal, and wherein the feedback signal is stored so as to provide historical samples thereof for providing the m-dimensional input vector.

SUMMARY OF THE INVENTION

The foregoing and other problems are overcome and the objects of the invention are realized by a nonlinear neural network oscillator that includes a neural network, a feedback gain/phase control circuit for adjusting feedback from an output of the neural network to a desired level and/or phase at a selected input to a delay line. The dimensionality of the output data is a function of the neural network dimensionality.

The nonlinear neural network oscillator enables a complex order of neural network outputs, inputs from the delay line (representing historical output values), and/or external inputs (forcing functions) to be manipulated into a single or multidimensional input vector. The delay line bidirectionally shifts single or multidimensional vector sets. The gain/phase feedback circuit may be embodied within a linear circuit, a nonlinear circuit, or another neural network.

It is shown that the nonlinear neural network oscillator is capable of being internally tuned to a chaotic condition and externally controlled as to its deterministic and statistical time domain characteristics. The oscillator may be used to train other neural networks with a series of input and output vectors, without the use of the original training data, for the purpose of copying the design of an original neural network. The oscillator may also be used to provide a source for complex "music" tones, and can also be employed to emulate nonlinear dynamic systems for study or experimentation. The oscillator can also function as a deterministic noise source. The oscillator can be constructed in hardware, can be implemented in software, or can be implemented as a combination of these two approaches. Nonlinear dynamic oscillations are developable that cannot be readily reproduced by an algorithmic technique. The oscillator can also function as an input vector converter to improve the recognition sensitivity of a recognition neural network. The oscillator can also be used as a component of an information storage system.

More specifically, there is disclosed a nonlinear oscillator that includes a neural network having at least one output for outputting a one dimensional vector. The neural network preferably has a plurality of layers, including an input layer, an output layer, and at least one hidden layer. Each of the layers includes at least one processing element that is interconnected to processing elements of adjacent layers typically, although not necessarily, in a fully populated configuration. The input layer has an input coupled to the at least one output and includes an analog delay line having a plurality of taps each of which outputs a time-delayed sample of the one dimensional output vector. Each of the taps is connected to each one of the processing elements of the at least one hidden layer for providing a time-delayed sample of the one dimensional output vector thereto.

The nonlinear oscillator further includes a feedback network that is interposed between the output of the neural network and the input of the input layer for modifying a magnitude and/or a polarity of the one dimensional output vector prior to the sample of the one dimensional output vector being applied to the input of the analog delay line. The analog delay line is capable of being shifted in either a first or a second direction.

Connection weights of the neural network are trained on a deterministic sequence of data from a chaotic source, such as a strange attractor, or may be a representation of a stochastic process, wherein each of the weights is randomly selected.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

The nonlinear neural network oscillator of this invention exploits the inherent nonlinear features of a neural network to produce a deterministic source or action. The output of the neural network is typically, but not always, fed back into the input of the neural network.

Figure 1A:
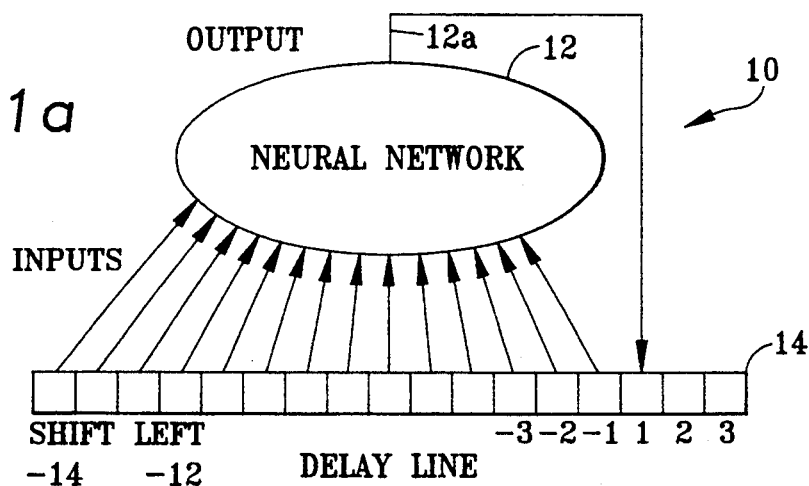
FIG. 1a is simplified block diagram of the nonlinear neural network oscillator of the invention.

As seen in FIG. 1a, the nonlinear neural network oscillator (NNNO) 10 includes a neural network 12 having an output 12a that is fed back to the input via a delay network or delay line 14. Preferably, the delay line 14 is implemented as a multi-stage analog shift register, such as charge-coupled device (CCD), and is capable of being shifted in a bidirectional manner. The information stored within the delay line 14 represents a historical record of a plurality of past states of the output 12a.

Figure 1B:
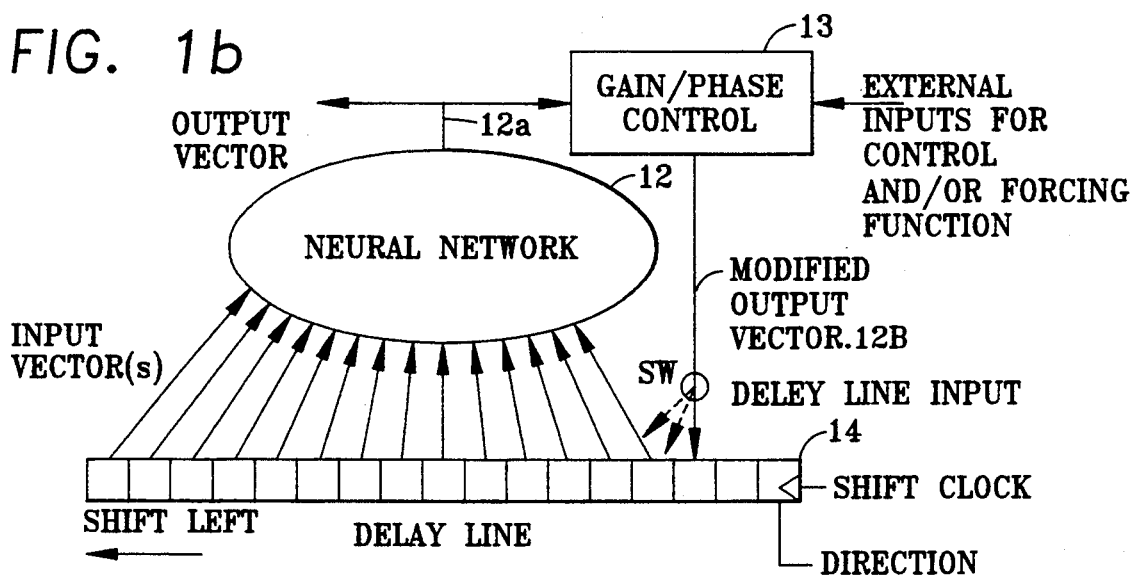
FIG. 1b is block diagram showing in greater detail the nonlinear neural network oscillator of the invention.

FIG. 1b illustrates in greater detail an exemplary embodiment of the oscillator 10 of FIG. 1a, and shows a feedback gain/phase control circuit 16 for adjusting the feedback from the output 12a to a desired level and/or phase (polarity) at a selected input to the delay line 14. The modified output vector 12b from the gain/phase control circuit 16 may be applied to any one of the delay line 14 taps, as indicated by the switching function (SW). In the oscillator 10, the dimensionality of the output data is a function of the neural network dimensionality. The generalized nonlinear neural network oscillator 10 enables a complex order of neural network 12 outputs, delay line 14 outputs (historical values), and external inputs (forcing functions) to be manipulated into a single or a multidimensional vector, and then be placed into the neural network 12 input. The delay line 14 shifts single or multidimensional vector sets. The gain/phase feedback circuit 16 may be a linear circuit, a nonlinear circuit, or another neural network. Also, neural network paradigms that include distributed delays through the neural networks may be used in the nonlinear neural network oscillator 10.

Figure 1C:
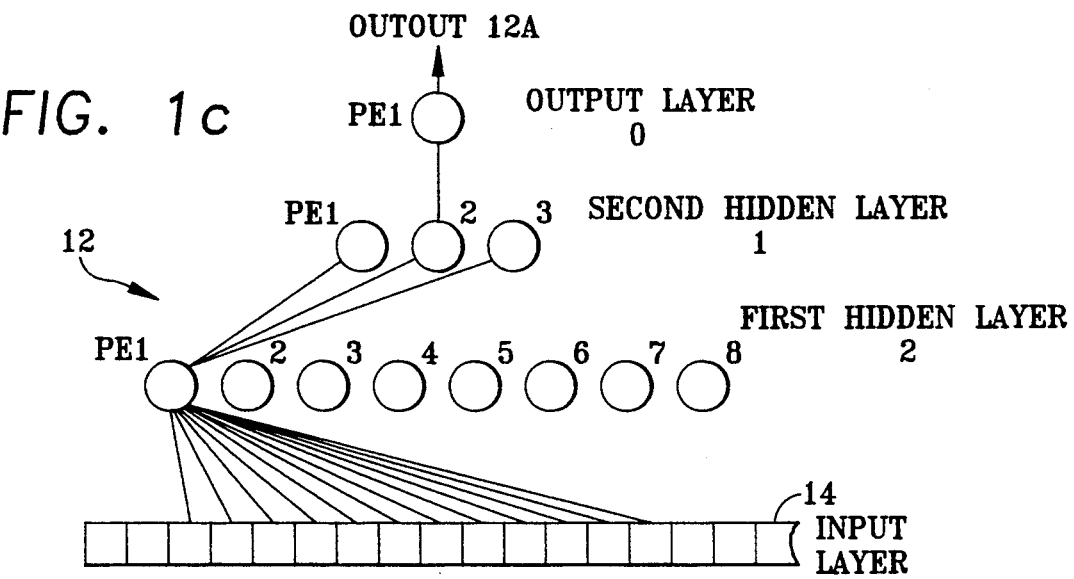
FIG. 1c illustrates the organization of one embodiment of a neural network for use in the nonlinear neural network oscillator of FIGS. 1a and 1b.
Figure 1D:
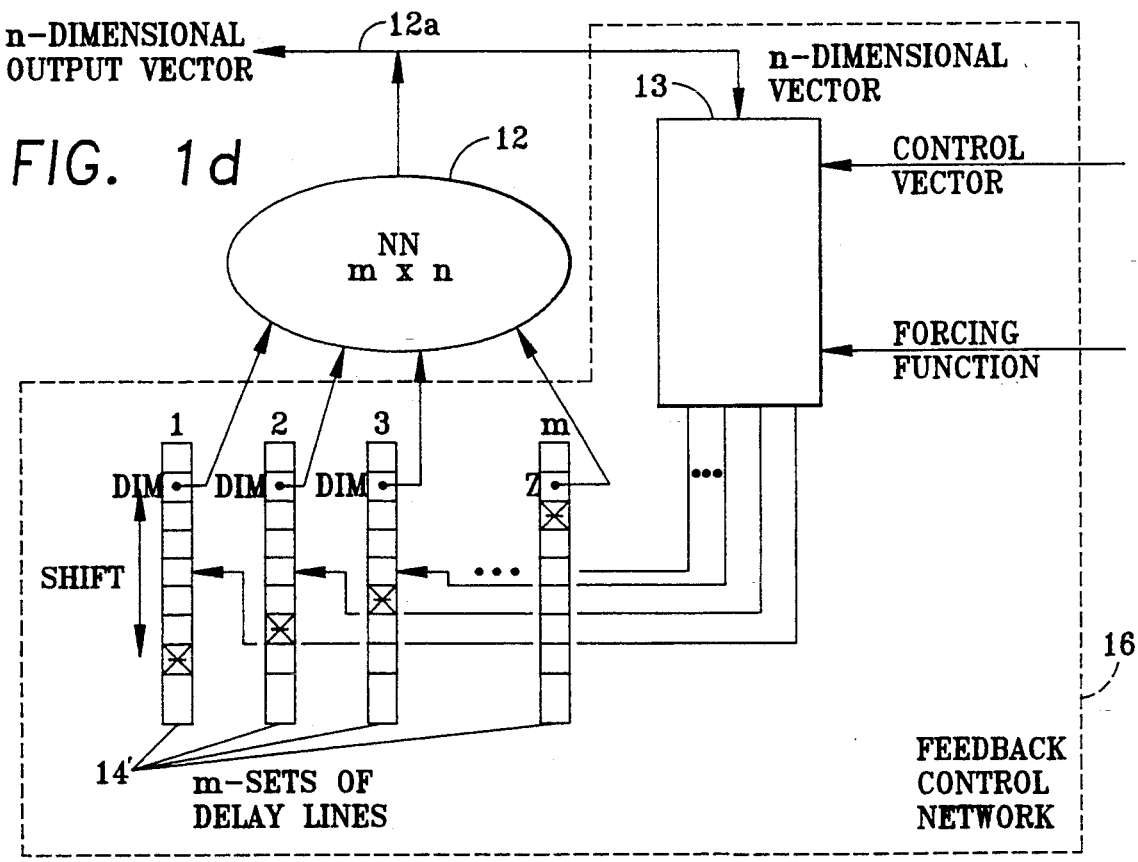
FIG. 1d is a block diagram showing a generalized nonlinear neural network oscillator of the invention.

FIG. 1d is a block diagram showing a generalized nonlinear neural network oscillator 10 of the invention. The neural network 12 provides a n-dimensional output vector which is fed back to an input of a control block 13. In the control block 13 the elements of the n-dimensional output vector are divided, adjusted in gain and in phase, and then directed to respective taps of the m delay lines 14', from where the adjusted elements are fed back into the neural network 12. The control block 13 also receives a control vector and/or a forcing function for use in modifying the elements of the output vector. The control block 13 may apply forcing function data to the neural network 12 with or without feedback from the n-dimensional output vector. The control block 13 may incorporate a neural network to combine or divide vector elements into common feedback signals.

It is noted that in FIG. 1d the delay line tap connections are arbitrarily drawn, in that the input tap connection to the neural network 12 is not specific. If the taps are taken at the stages designated with an asterisk (*), the delay line configuration defaults to the embodiment shown in FIG. 1b.

FIG. 1c illustrates in greater detail an exemplary embodiment of the neural network 12, also referred to herein as a primary neural network. The neural network 12 is comprised of four layers designated as layer 0, the output layer; layer 1, the second hidden layer; layer 2, the first hidden layer; and layer 4, the input layer. Layer 0 has one neuron, or linear processing element (PE1), layer 1 has three PEs (PE1-PE3), layer 2 has eight PEs (PE1-PE8) and layer 4 has 12 PEs, illustrated in FIG. 1c as delay line stages $-1$ to $-12$. A specific PE is identified first by the layer in which it resides, and then by the PE number. For example, PE2 of the second hidden layer is designated as (1, PE2) or more simply (1, 2). In this embodiment, all layers are fully populated, that is, each PE receives an input from each PE in a lower layer and proves outputs to each PE in a higher layer. In other embodiments of the invention the neural network 12 may be sparsely populated. In FIG. 1c only the connectivity for (2, 1) is illustrated for simplicity, it being realized that PEs (2, 2) through (2, 8) are connected identically. The strength of each connection is determined by an associated weighting factor, or weight. The weights are adjusted to produce a desired output value during a training session, or may be initially set to random values without training. More particularly, and in accordance with an aspect of the invention, connection weights of the neural network are trained on a deterministic sequence of data from a chaotic source, such as a strange attractor, or may be a representation of a stochastic process, wherein each of the weights is randomly selected.

In general, the neural network specification as to the number of the inputs, the number of layers, and also the number of PEs that comprise the output and hidden layers, is a function of the output signal dimensionality requirements. That is, the specific neural network topology illustrated in FIG. 1c is exemplary, and is not to be read in a limiting sense upon the practice of the invention.

It is noted that the nonlinear neural network oscillator 10 can be constructed in hardware, can be implemented in software, or can be implemented as a combination of these two approaches.

In accordance with an aspect of the invention, it has been found that when a neural network is trained on a deterministic sequence of data from a chaotic source, the weights develop a representation of chaos. A neural network with such a representation, when used in a NNNO, will produce dynamics of chaos. Such a NNO can produce chaotic dynamics beyond the original system when operated under a variation of delay, phase and gain in the feedback path (other conditions than trained under). This behavior is illustrated in the bifurcation plots of FIGS. 4a-4e.

Previously, dynamical systems of a deterministic chaos were thought to be purely stochastic or random. A neural network having random weights has a sampled set of a representation of a stochastic system. When such a neural network is used within the NNNO 10, it produces dynamics of a "bounded" stochastic system. The dynamics are deterministic and provide a representation of the sample set of weights. Different random weight sets produce different and new subsets of dynamics from the pure stochastic system.

The neural network weights of a chaotic system and the weights of a stochastic system have a common representation of instability. The combination of the nonlinear sigmoids and weights, with representations of instability, are the neural network requirements 12 that will produce a "good" nonlinear neural network oscillator.

In accordance with the foregoing, the characteristics of the nonlinear neural network oscillator 10 generally conforms to the rules of "chaos theory". As employed herein, chaos theory is considered to describe a deterministic behavior in a dynamical system. Reference in this regard is made to "Chaos-Making a New Science" by James Gleick, Viking Penguin, Inc., New York (1987) for an overview of chaos theory, including a discussion of strange attractors and, in particular, the quadratic or Fiegnbaum strange attractor (pages 149-151). Reference is also made to "Dynamical Systems and Fractals-Computer Graphics Experiments in Pascal" by Karl-Heinz Becker and Michael Dorfler, Cambridge University Press, (1989), particularly chapter 3, for a discussion of strange attractors and, in section 3.2, the Henon attractor.

By example, the primary neural network 12 was initially trained on continuous examples of a strange attractor, specifically the Henon attractor, until the neural network's output 12a reached a correlation level greater than 0.95. As described at page 62 in the text by Becker and Dorfler, the Henon attractor refers to a sequence of points $(x_n, y_n)$ generated by the recursive formulas:

$$x_{n+1} = y_n - a^* x_n^2 + 1 \qquad (1)$$

$$y_{n+1} = b^* x_N \qquad (2)$$

where a and b are proportionality constants. For the example employed herein a $=7/5$ and b$=3/10$.

The resulting PE weights, after training, are listed in Appendix A. After training and developing the weights listed in Appendix A, it was found that the nonlinear neural network oscillator 10 was capable of predicting a next value of X, when presented with instances of previous values of X resulting from successive instances of solutions of the Henon attractor. The training process employed the historical and current samples of a chaotic data sequence. The goal of the training was to predict the future chaotic sequence from the historical samples. The current sample was used as the training output vector and the 12 consecutive historical samples are the elements of the neural network's input vector. When the NNNO 10 output is fed directly into the delay line tap that is adjacent to the latest historical values, then shifted into that historical position, the NNNO 10 produces a sequence of data that matches the original sequence for a period of time. The rate of divergence of the NNNO 10 to the chaotic sequence is a function of the final correlation of the neural network to the training data. The operating conditions of shift left, feedback of 1, and a tap of 1 match the conditions of the training environment.

Operation of the NNNO 10 other than in the training environment produces a variety of limit cycles and broadband chaos. Examples of these can be seen in FIG. 2 and the bifurcation plots of FIGS. 4a–4e.

Figure 2A:
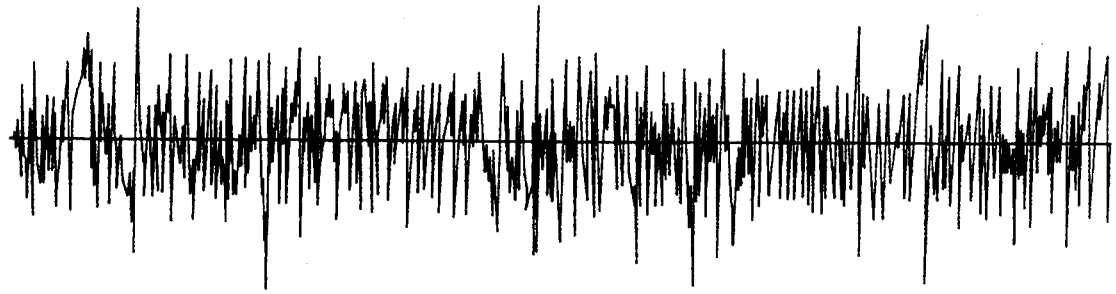
FIGS. 2a-2r are waveforms showing the output of the nonlinear neural network oscillator for various input conditions, feedback conditions, and delay line feedback propagation directions.
Figure 2B:
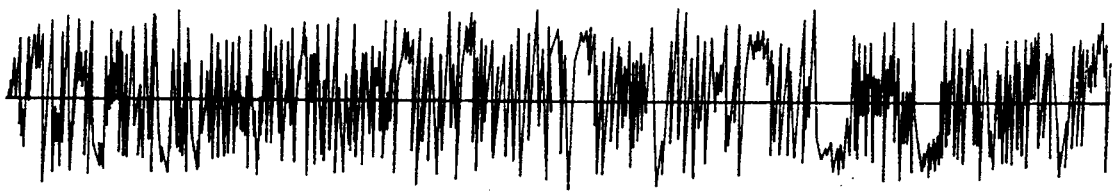
Figure 2C:
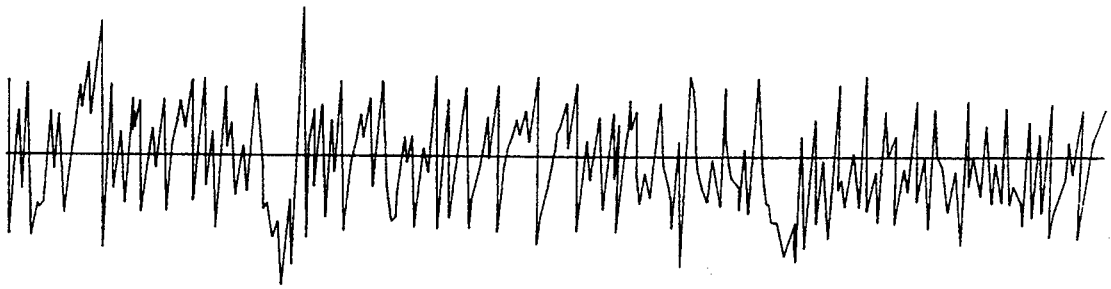
Figure 4A:
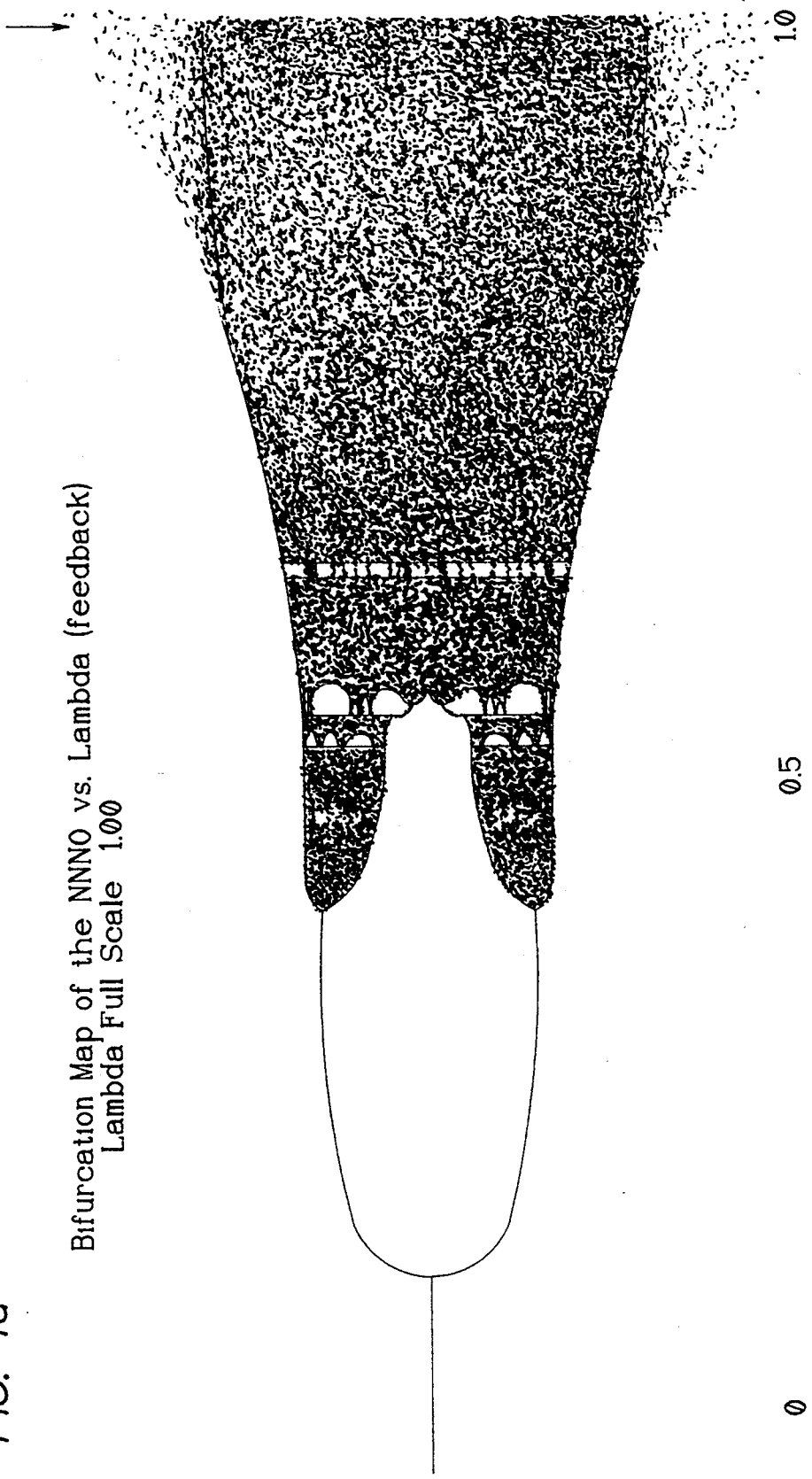
FIGS. 4a-4e are each a bifurcation map of the nonlinear neural network oscillator plotted for various values of lambda (feedback).
Figure 4B:
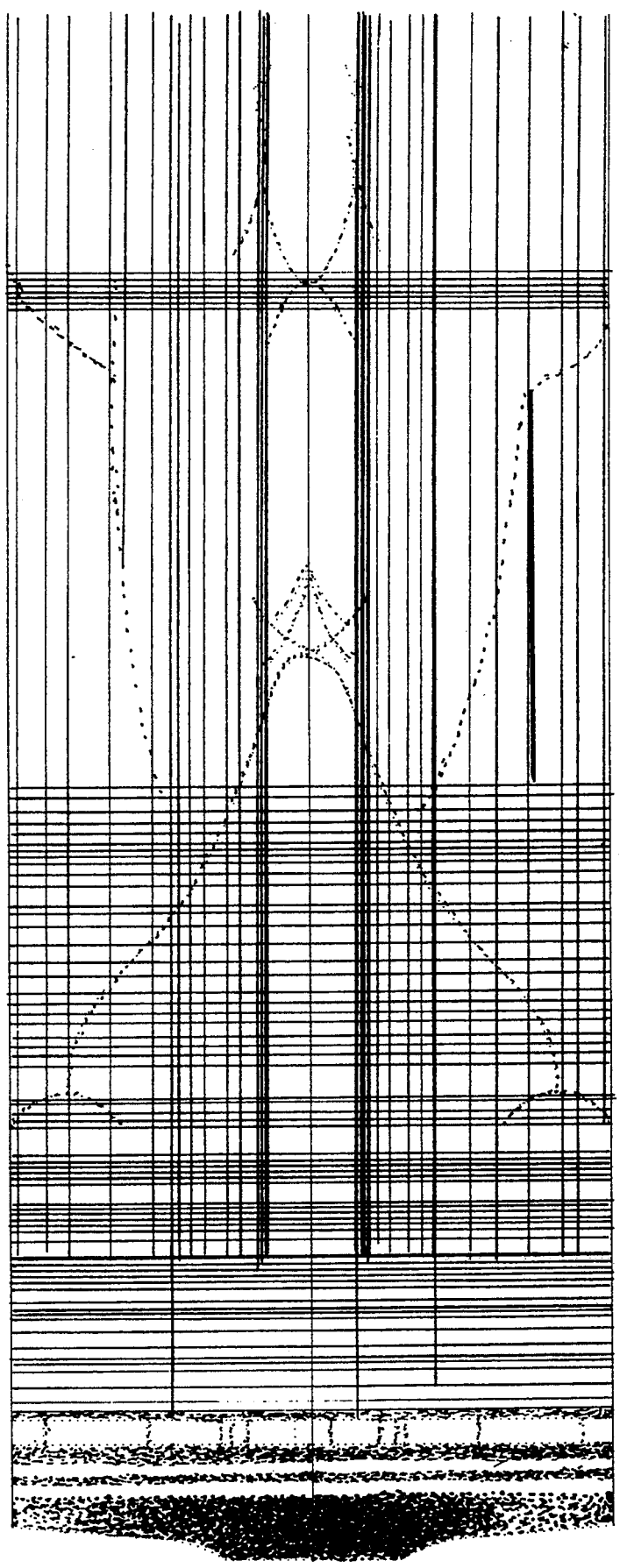
Figure 4C:
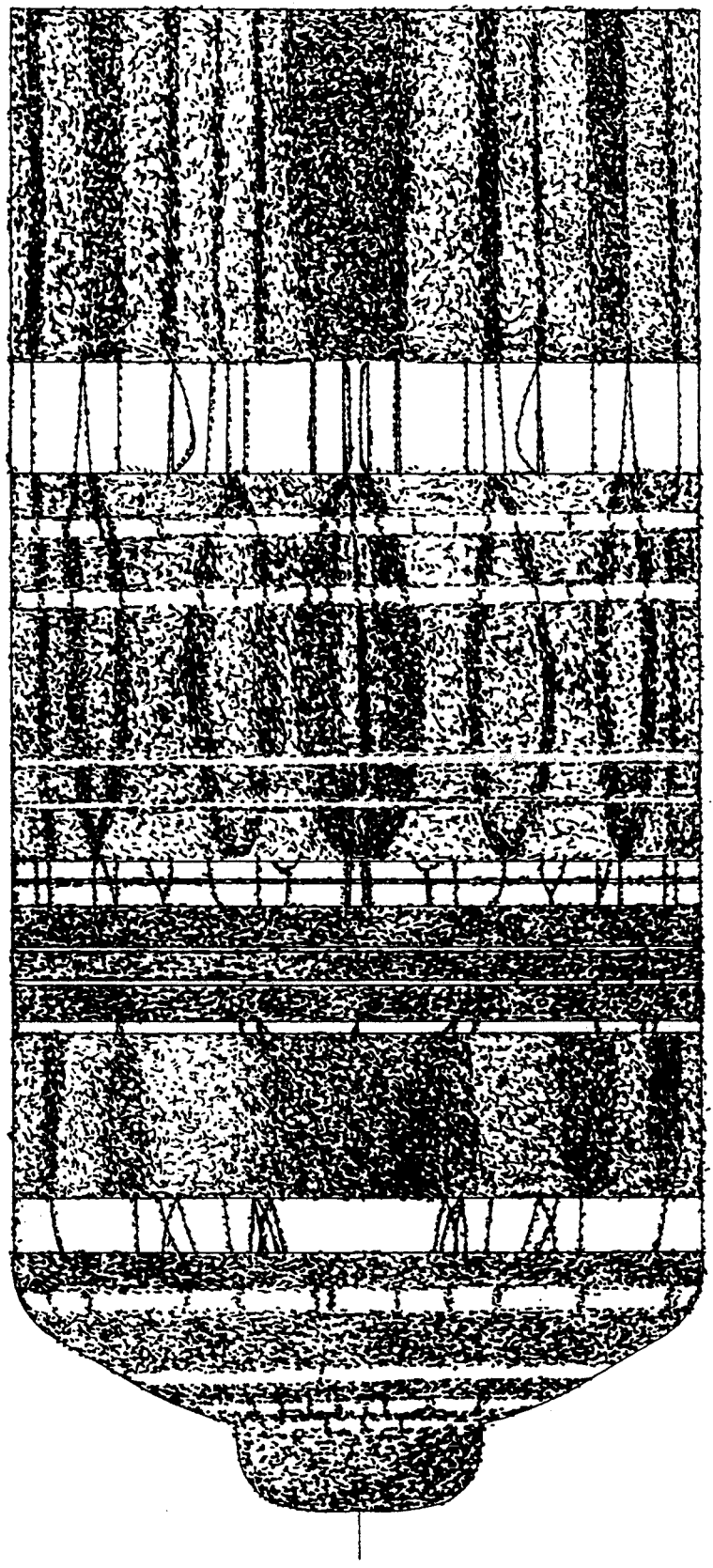
Figure 4D:
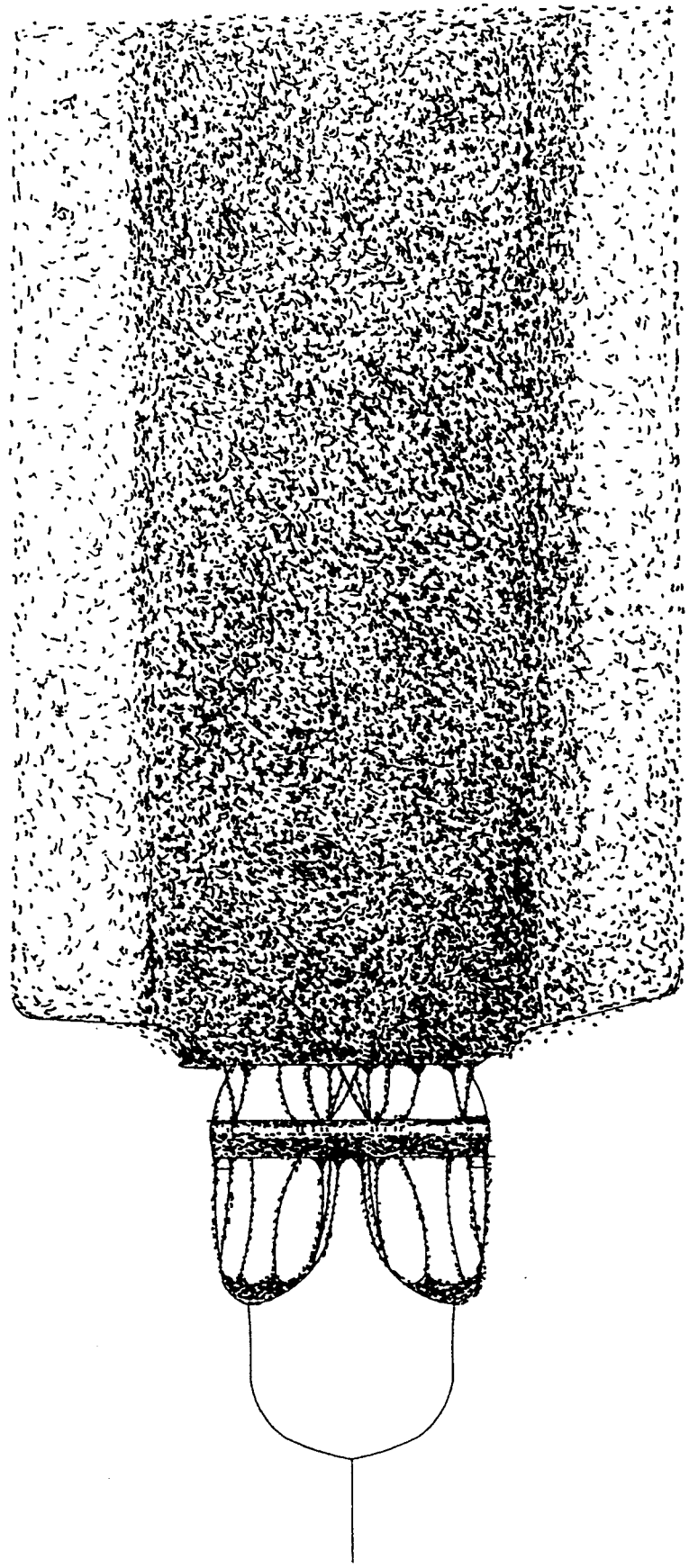
Figure 4E:
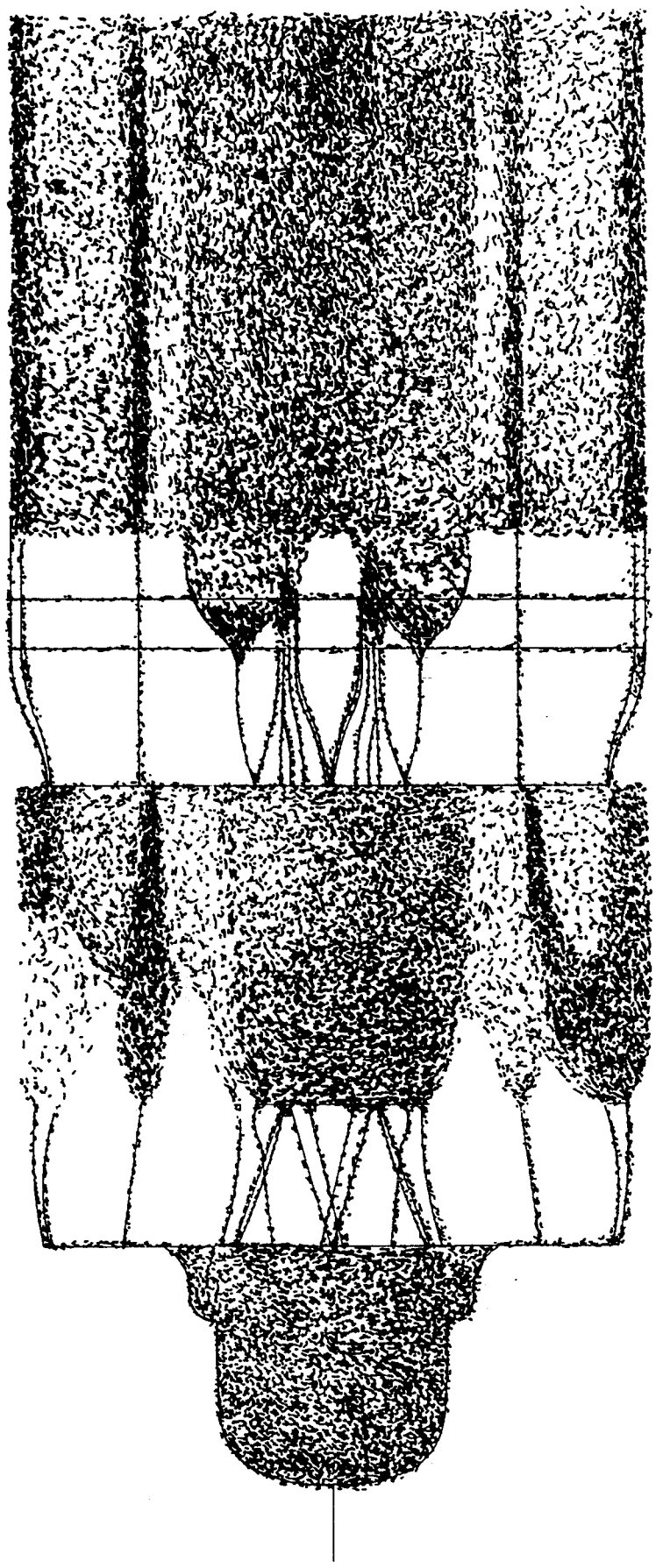

Referring to FIG. 4a, the right side edge represents the conditions for the waveforms in FIGS. 2a and 2c. FIG. 4a is also a small part of the plot in FIG. 4b. The FIGS. 4a–4e are all examples of bifurcation plots of the NNNO 10 for changing feedback control (i.e., gain, phase and tap positions) for the neural network trained on the Henon attractor.

Figure 2D:
Figure 2E:
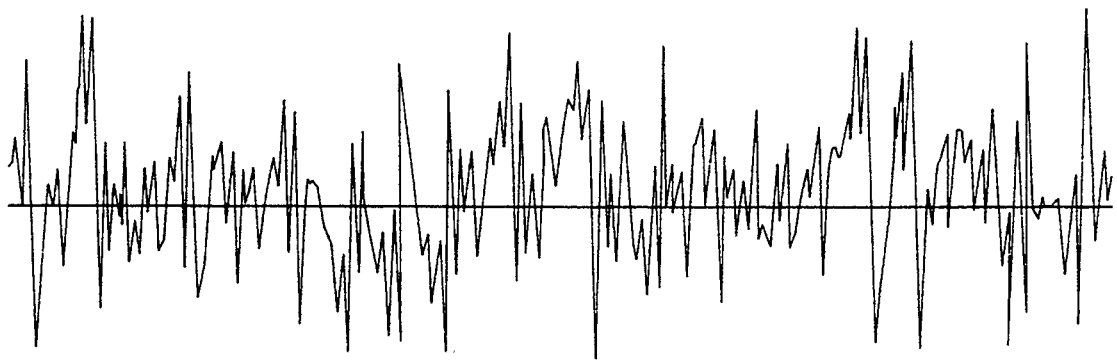
Figure 2F:
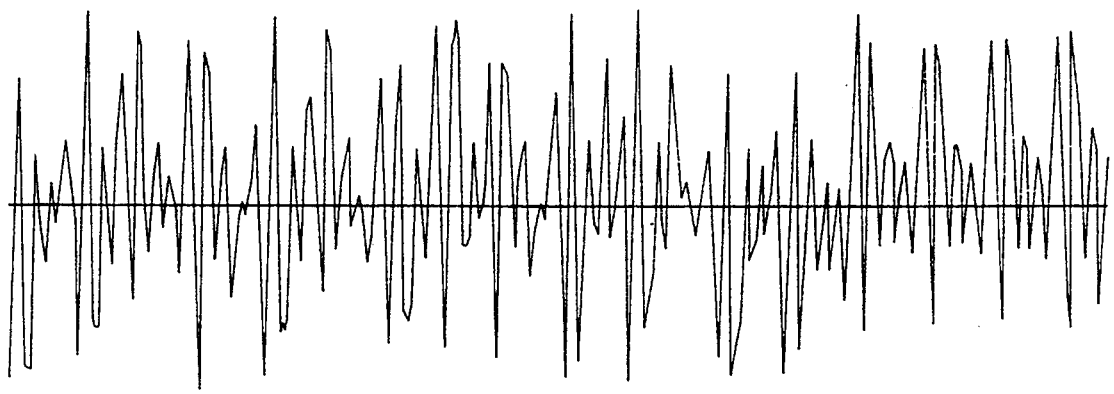
Figure 2G:
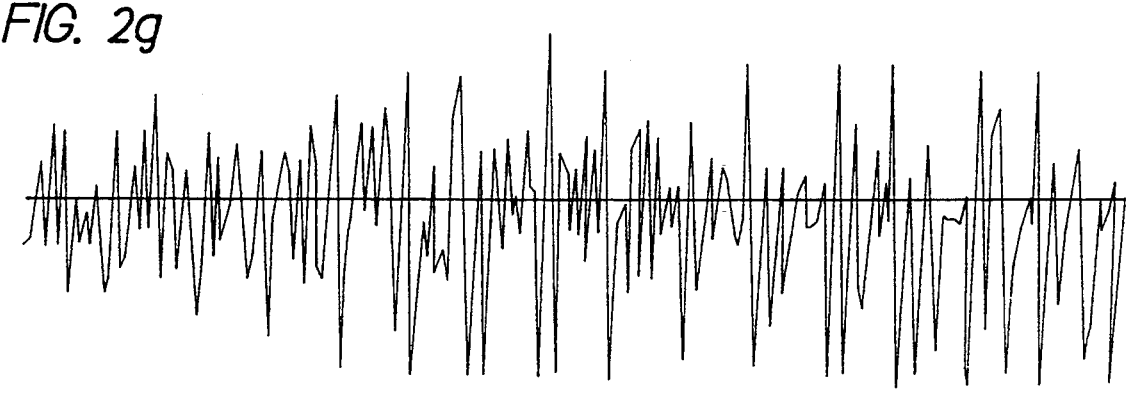

In one case, illustrated in FIG. 2g, the input vector to the neural network 12 is reversed from the manner in which the network was trained. That is, during training the delay line 14 was shifted from right to left (left-shift), while subsequently the delay line was shifted from left to right (right-shift). As such, the NNNO 10 was driven beyond the training boundary conditions. In a second case, illustrated in FIGS. 2q and 2r, the neural network 12 was seeded with the random weights listed in Appendix B, with no training. A third neural network was trained in a similar manner to the primary neural network, but to a lesser correlation, and is referred to herein as a secondary neural network.

The ensuing examples assume the use of the configurations of FIGS. 1b and 1c. In operation, the neural network 12 senses the input m-dimensional vector as the values presented on taps $-1$ to $-14$ of the delay line 14. The neural network 12 produces a one dimensional output vector that may be modified by the gain/phase control circuit 16 so that the output vector signal appearing at the output 12a is scaled in gain and/or changed in polarity (phase). The resultant signal is applied to the delay line 14 (shift register) at a specified one of the taps. The delay between taps (shift clock period) is preferably made at least equal to the sum of the response time of the neural network 12 and the gain/phase control circuit 16. External inputs may also be used to change the feedback parameters and/or to enter forcing function data into the delay line 14. An externally applied forcing function may be summed with all or none of the feedback values and then applied to the delay line 14.

The feedback model for the examples given below is specifically designed for simplicity, it being realized that the general form of feedback can be made more complex, depending upon the desired response. In general, any deterministic process can be used as feedback to produce the input vector for the neural network 12. That is, the feedback can employ (a) the neural network 12 output vector, (b) historical and/or external data possibly modified by algorithmic and/or functional processes, and/or (c) another neural network, to produce the desired neural network input vector. Also, the input, output and historical data can be single dimensional vector data or multidimensional vector data.

Figure 2H:
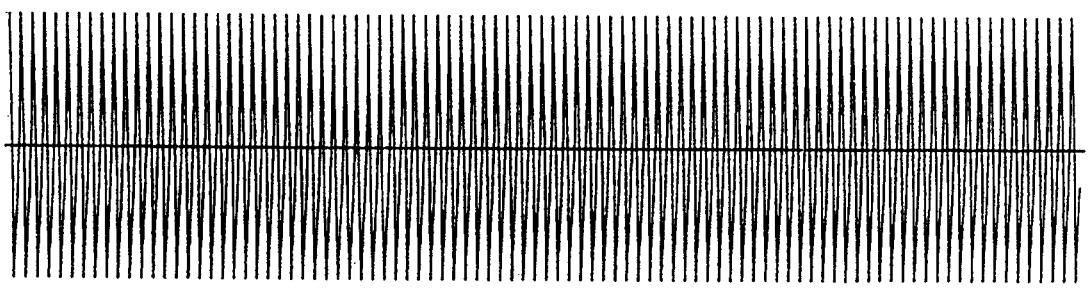
Figure 2I:
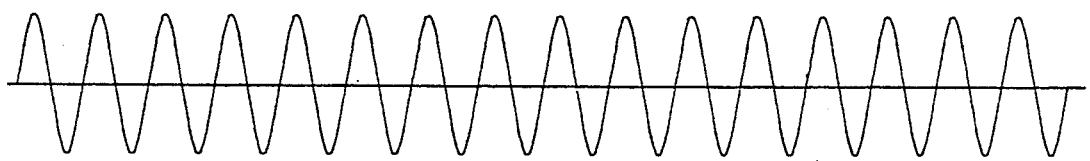
Figure 2J:
Figure 2K:
Figure 2L:
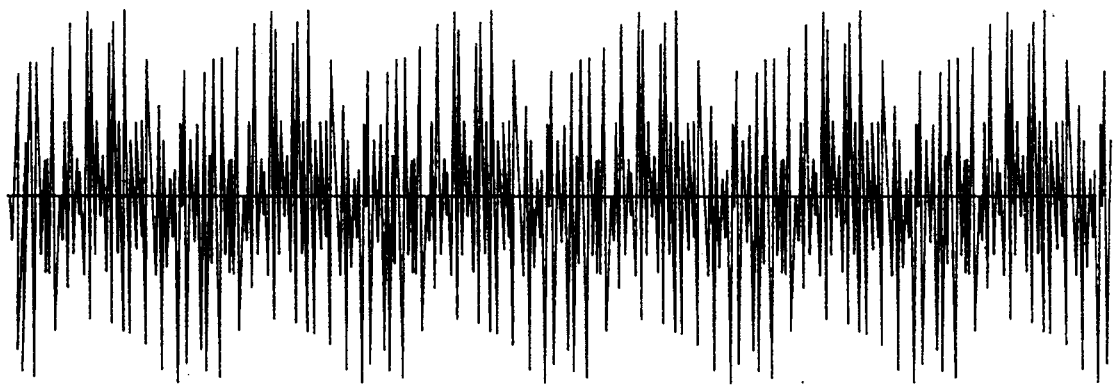
Figure 2M:
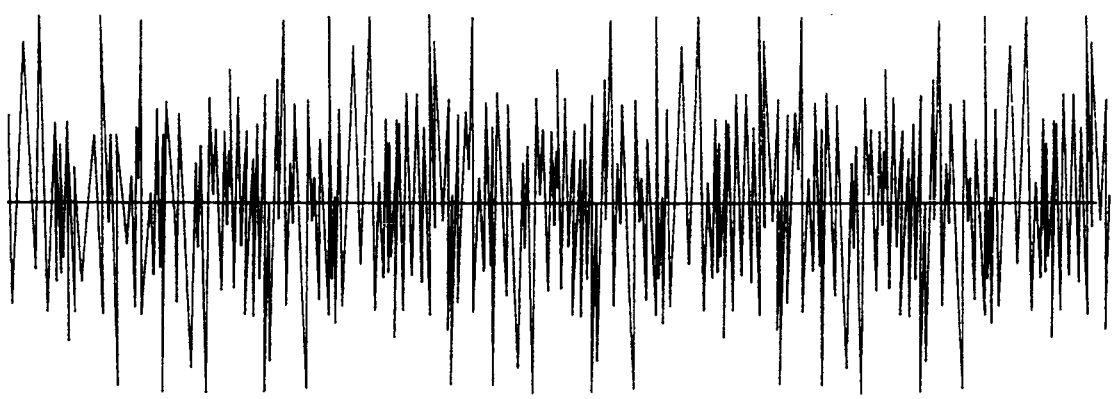
Figure 2N:
Figure 2O:
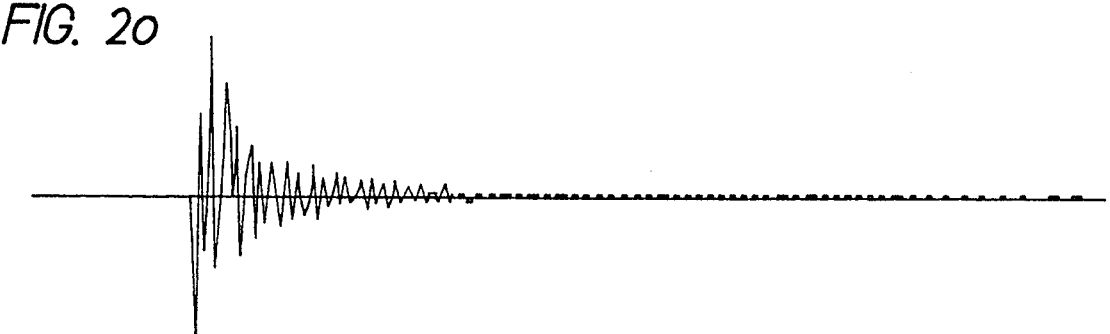
Figure 2P:
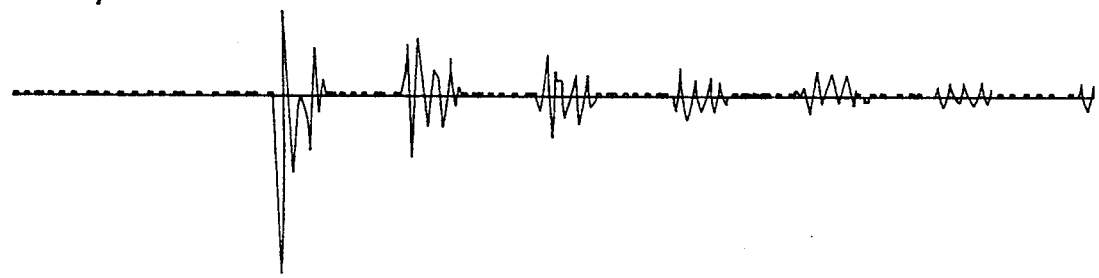
Figure 2Q:
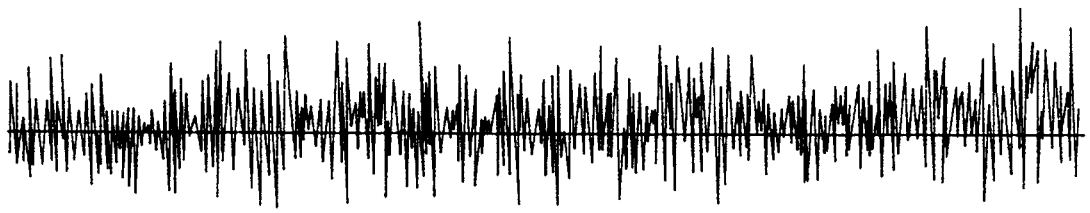
Figure 2R:
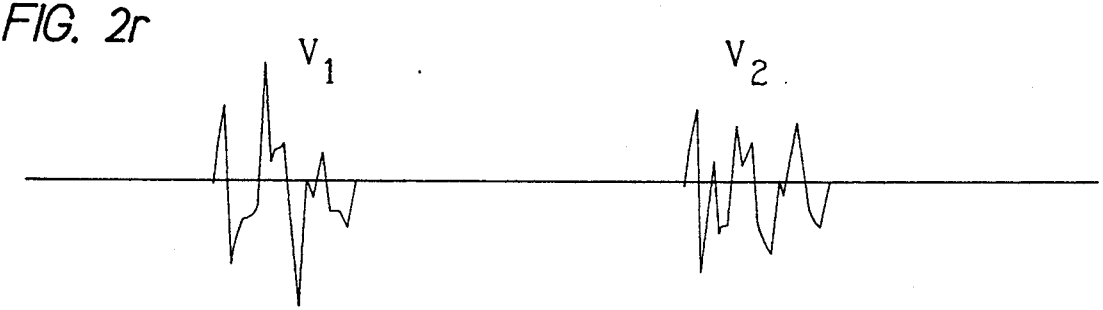

With reference to the waveforms of FIGS. 2a through 2r, the following terms are defined:

Normalized Time Full Scale:

This is a relative time scale of the plotted signal from the output 12a. A value of 1.00 represents a plot of 640 sample data points for the full scale of the plot. Conversely, a value of 0.33 is one third of the sample data points with a relative sweep speed of three. Specifically, FIGS. 2a, 2b, 2k, 2l, 2m and 2q all have a normalized time full scale of 1.00; FIGS. 2c, 2d, 2e, 2f, 2g, 2h, 2i, 2j, 2n, 2o and 2p all have a normalized time full scale of 0.33; and FIG. 2r has a normalized time full scale of 0.20.

Feedback:

This is the value (magnitude) and sign (polarity) of the amount of neural network 12 output data that is fed back into the neural network, via gain/phase control circuit 16.

L-delay line:

The delay line 14 (or analog shift register) shifts to the left. R-delay line indicates a shift to the right.

Tap ( ):

This is the delay line 14 tap to which the feedback is applied. The convention used is as follows: the feedback signal is connected to tap 1 of the delay line 14, which is the first tap past the neural network input to the right (FIG. 1a). The next two taps to the right are designated as 2 and 3. The first tap to the left of the tap to which the feedback is applied is referred to as −1. The remaining taps to the left are negative in increasing in order. The last tap on the left is, by example, −14, and the first hidden layer of the neural network 12 receives inputs from taps −1 to −12. There are no implied limits as to the number of delays in the delay line.

So as to further describe the operation of the nonlinear neural network oscillator 10, a description of the significance of the waveforms of FIGS. 2a–2r is now given.

FIG. 2a: This figure shows a typical chaotic output of the nonlinear neural network oscillator 10. The neural network used to generate the plot was the primary neural network, as defined above. The primary neural network is used in all of the ensuing nonlinear neural network oscillator 10 embodiments unless otherwise specified.

FIG. 2b: This figure illustrates the variation in the chaotic output waveform when a neural network of different features is used, and should be compared to the waveform of FIG. 2a. Both nonlinear neural network oscillators (FIGS. 2a and 2b) were seeded with the same input vector at the start of the waveforms. The neural network 12 that generated the plot of FIG. 2b is the secondary neural network, as defined above.

FIG. 2c: This figure shows a sample of the temporal characteristics of the nonlinear oscillation. This is a reference plot so that waveforms produced by the variation in feedback can be compared. The primary neural network was used.

FIG. 2d: This figure illustrates an example wherein the feedback is half of the value that was used in FIG. 2c. The waveform clearly depicts a change in character, and also clearly shows a simple limit cycle of a multifrequency signal.

FIG. 2e: In this figure the feedback is changed to 1.9 and the waveform is similar to that of FIG. 2c. There is an appearance of a shift toward lower frequencies.

FIG. 2f: This figure shows that a change in feedback polarity from that of FIG. 2e does not stop the oscillation but instead changes the temporal characteristic quite dramatically. As can be seen, there are short periods of a common periodicity of the waveform followed by imprecise periods.

FIG. 2g: The purpose of this Figure is to show that the primary neural network will produce nonlinear oscillations, even when it is provided a grossly altered temporal input vector. The delay line of FIG. 1b is shifting right, and the feedback point is two taps, or periods, to the left of the end of the neural network input.

FIG. 2h, 2i, 2j: Sinewave oscillation is a subset of the outputs of the nonlinear neural network oscillator 10. The waveform in FIG. 2h is produced when the delay line 14 is shifting right. With the same feedback connection, and the delay line 14 shifting left, the lower frequency sinewave of FIG. 2i is developed. The sinewave of FIG. 2j is developed with the feedback connection of the highly nonlinear signal of FIG. 2a, but with the feedback value set to only 0.20 of the value of FIG. 2a.

FIGS. 2k, 2l, 2m: These figures illustrate nonlinear repetitive signals having relatively short periodic intervals, as indicated by the period designated "PI". Significantly, these waveforms approximate a complex musical tone having a unique harmonic content, or timbre, and are presented in their order of complexity.

FIGS. 2n, 2o, 2p: The nonlinear neural network oscillator 10 is shown to cease production of a continuous oscillation when the feedback is reduced below a critical level. When such a network is "hit" with an impulse forcing function it develops a deterministic transient response. FIG. 2n shows an excitation of the nonlinear neural network oscillator 10 impulsed by a positive, one sample pulse. FIG. 2o illustrates a transient that was generated by a forcing function of two sample pulses, wherein the first pulse had a positive polarity and the second pulse had a negative polarity. The transient depicted in FIG. 2p shows a decaying multi-transient set of waveforms.

FIG. 2q: This figure clearly illustrates that the neural network 12 does not specifically require special training, but that it must have weights that have a representation of instability. Both chaos and stochastic systems are at the opposite pole of stability. The neural network 12 used for this figure was generated by a random set of weights listed in Appendix B. This set of random weights has a "sampled" representation of a stochastic system, as evidenced by the noisy waveform.

In general, if emulation of a particular nonlinear system is desired, then the neural network 12 is trained with a representative sample of that system so as to learn the unstable features caused by the system's nonlinearities. When trained, the nonlinear neural network oscillator 10 then mimics, or simulates, the nonlinearities of the desired system.

FIG. 2r: This figure shows a relatively large variation in the output 12a for two closely similar input vectors (V1 and V2). For this example, V1 is −9, 3, 6, −1, 7 and V2 is −9, 3, 1, −1, 7. The neural network 12 was seeded with the random weights of Appendix B, and the delay line 14 is driven with the input vectors by the external forcing function.

Based on the foregoing, it can be appreciated that the nonlinear neural network oscillator 10 can be used for a number of useful applications. These include, but are not limited to, the following.

The nonlinear neural network oscillator 10 can be used as a complex musical source, as was indicated above with respect to FIGS. 2k, 2l and 2m, an is capable of generating musical tones with various unique timbres.

As was shown in FIG. 2r, the nonlinear neural network oscillator can be used as a vector converter to produce large vectoral differences for input vectors that have small linear differences. This enables recognition neural networks, such as those employed for visual and auditory recognition, to have an increased range of discrimination. The neural network 12 that is used as part of the oscillator 10 has the random weights listed in Appendix B.

Figure 3:
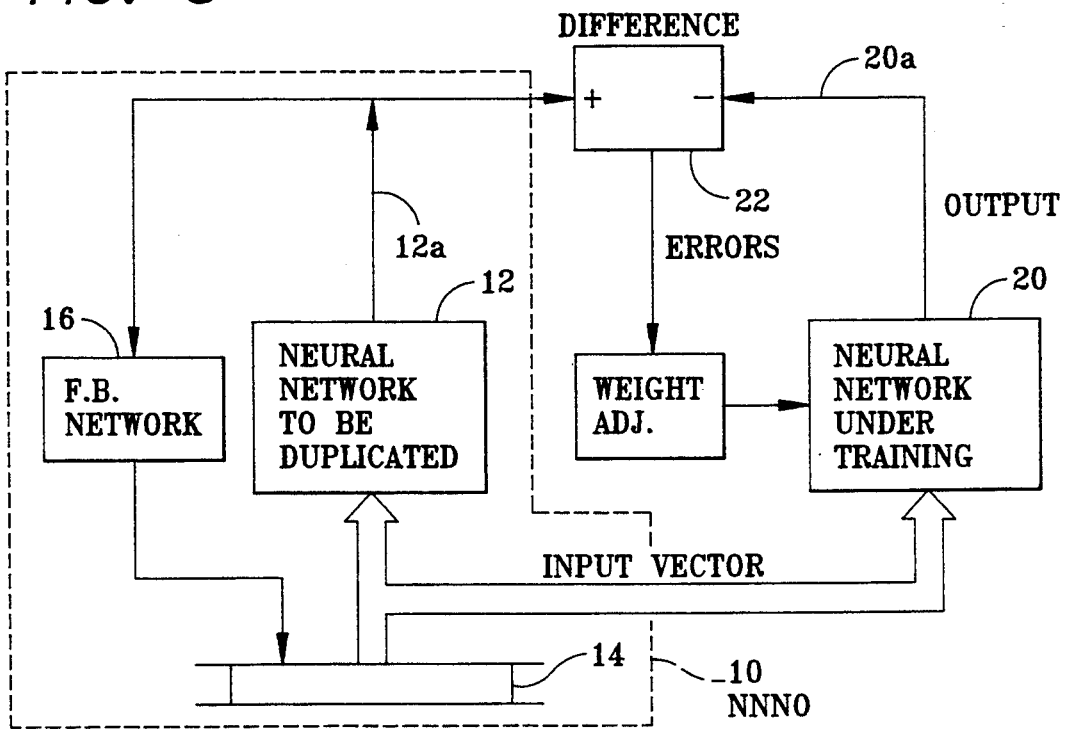
FIG. 3 is a block diagram illustrating the use of the nonlinear neural network oscillator in training another neural network.

Another important application for the nonlinear neural network oscillator 10 is to copy a hardware neural network or neural networks which have inaccessible weight values. As seen in FIG. 3, the training is accomplished without requiring the use of the original data set that was used to train the original neural network 12 of the nonlinear neural network oscillator 10. During training the neural network 20 receives the input vectors, and the weights are set according to the specific topology of the neural network 20 (back-propagation, etc.) so as to achieve the desired output vector. Training is initiated with at least one stage or tap of the delay line 14 having an input vector. The initial input vector may be chosen randomly. In response to the one input vector, the neural network 12 generates a corresponding deterministic output vector, which is modified by the feedback network 16, stored within the delay line 14, and subsequently shifted. In response to the two input vectors present in the delay line 14, the neural network 12 outputs a second deterministic output vector, which is adjusted and stored within the delay line 14. The m-dimensional input vectors are also applied to the neural network 20, which outputs, in response to each input vector, an output vector 20a. A difference block 22 compares the output vectors 12a and 20a and provides an error output having a value that is indicative of the difference between the vectors 12a and 20a. The error output is provided to the weight adjustment block 24 which adjusts the weights of the neural network 20 so as to minimize the error signal. This process continues, with the weights of the neural network 20 being adjusted for each output vector from the neural network 12, until the desired degree of correlation is achieved.

Preferably, the nonlinear neural network oscillator 10 is operated at its widest bandwidth to ensure that each neuron (PE) transitions through all possible states. If the bandwidth of the nonlinear neural network oscillator 10 is too low, and only produces narrow band limit cycles, the feedback network is preferably provided with another neural network to provide further instability to the nonlinear neural network oscillator 10.

The nonlinear neural network 10 can also be employed for low cost, nonlinear dynamic system experimentation. Examples of nonlinear systems are biological, chemical, mechanical, electrical and physical systems. The emulation of the nonlinear dynamic systems requires that the neural network 10 be trained using data from examples of the nonlinear dynamic system that the nonlinear neural network oscillator 10 is to represent. Observation of the output of the resulting emulator indicates when external controls are to be used in order to have the highest effect on the nonlinear dynamic system. It is noted that the emulator may exhibit a difference in the "initial condition sensitivities" from that of the nonlinear dynamic system to be modeled. In general, the higher the degree of correlation that is achieved during training, the closer will the initial condition sensitivity of the nonlinear neural network oscillator 10 be to the nonlinear dynamical system.

In a further embodiment of the invention, the output 12a of the nonlinear neural network oscillator 10 is employed as a deterministic noise source.

The nonlinear neural network oscillator 10 may also be used to produce nonlinear dynamic outputs of a type that cannot be readily developed by algorithmic means without copying the neural network transfer function.

The NNNO 10 can furthermore be used to an advantage as an information storage system. In this case the system does not store a replica of an input vector, but instead produces a representation of the input vector. The representation used in this context is as in recognition. Therefore, when an input vector is applied as a specific control vector the NNNO 10 produces a unique pattern of activation that represents the remembrance of the input vector. Different limit cycles produce different patterns of activation in the NNNO 10 processing elements.

By example, an additional neuron and its connections will alter the limit cycle patterns of activation. When such a neuron is inhibited and activated by the control network, the effect of the additional neuron produces a capability of increased representations. More than one such additional neuron can be applied to the NNNO 10.

In the general form of the NNNO 10 there is a multi-element output vector. For each independent element of the vector that is fed back, the NNNO 10 produces a new set of deterministic limit cycles to represent information.

While the invention has been particularly shown and described with respect to preferred embodiments thereof, it will be understood by those skilled in the art that changes in form and details may be made therein without departing from the scope and spirit of the invention.

Appendix A

| Connection values | Layer Number | Processing Element Number | Connection Number |
|---|---|---|---|
| 0.756520805346700 | 0 | 1 | 1 |
| −0.745771639181141 | 0 | 1 | 2 |
| 1.315115327032800 | 0 | 1 | 3 |
| −0.140363185638423 | 1 | 1 | 1 |
| −0.453451182471140 | 1 | 1 | 2 |
| 1.306951491490180 | 1 | 1 | 3 |
| 1.152141735255740 | 1 | 1 | 4 |
| −0.495237351831632 | 1 | 1 | 5 |
| 0.829950203879331 | 1 | 1 | 6 |
| 0.071639667843763 | 1 | 1 | 7 |
| −0.045897372687057 | 1 | 1 | 8 |
| 0.784810907465553 | 1 | 2 | 1 |
| −0.632175891611248 | 1 | 2 | 2 |
| 0.079631321734909 | 1 | 2 | 3 |
| 0.445330443174895 | 1 | 2 | 4 |
| 0.366858067318985 | 1 | 2 | 5 |
| 0.368449726058108 | 1 | 2 | 6 |
| −0.672256471001219 | 1 | 2 | 7 |
| 0.389082538613071 | 1 | 2 | 8 |
| −0.374243020553804 | 1 | 3 | 1 |
| 1.085152289315040 | 1 | 3 | 2 |
| 0.161389399891437 | 1 | 3 | 3 |
| −0.690729619443505 | 1 | 3 | 4 |
| 1.681907764740960 | 1 | 3 | 5 |
| −0.579046192497647 | 1 | 3 | 6 |
| 0.389023138881919 | 1 | 3 | 7 |
| −1.444120650486670 | 1 | 3 | 8 |
| −0.496044398245458 | 2 | 1 | 1 |
| 0.314901483293378 | 2 | 1 | 2 |
| 1.206760573240210 | 2 | 1 | 3 |
| −0.233140942353107 | 2 | 1 | 4 |
| 1.324037766809500 | 2 | 1 | 5 |
| 0.157817377837581 | 2 | 1 | 6 |
| 0.715009721732507 | 2 | 1 | 7 |
| 0.115069801017377 | 2 | 1 | 8 |
| 0.091029850696349 | 2 | 1 | 9 |
| 0.097654876902741 | 2 | 1 | 10 |
| 0.013982391684587 | 2 | 1 | 11 |
| 0.023592617403378 | 2 | 1 | 12 |
| 0.112350764227792 | 2 | 2 | 1 |
| 2.294770715634890 | 2 | 2 | 2 |
| −0.784744086000907 | 2 | 2 | 3 |
| 0.250480458205476 | 2 | 2 | 4 |
| −0.001206699033454 | 2 | 2 | 5 |
| 0.082101127950837 | 2 | 2 | 6 |
| −0.070030415650809 | 2 | 2 | 7 |
| −0.041403035843530 | 2 | 2 | 8 |
| −0.008332153731182 | 2 | 2 | 9 |
| 0.007228639966204 | 2 | 2 | 10 |
| −0.011923477098080 | 2 | 2 | 11 |
| −0.003152110691927 | 2 | 2 | 12 |

Appendix A

| Connection values | Layer Number | Processing Element Number | Connection Number |
|---|---|---|---|
| 1.205646601364620 | 2 | 3 | 1 |
| −1.612505949260090 | 2 | 3 | 2 |
| 0.061708314027931 | 2 | 3 | 3 |
| 0.528995085693160 | 2 | 3 | 4 |
| 0.499642894131226 | 2 | 3 | 5 |
| 0.053184701511075 | 2 | 3 | 6 |
| 0.130292490255304 | 2 | 3 | 7 |
| 0.067470191024758 | 2 | 3 | 8 |
| −0.062577935620642 | 2 | 3 | 9 |
| 0.047543777998267 | 2 | 3 | 10 |
| −0.006462366929793 | 2 | 3 | 11 |
| −0.039675766770355 | 2 | 3 | 12 |
| 0.379304191489957 | 2 | 4 | 1 |
| −1.742871747171030 | 2 | 4 | 2 |
| −0.010614831537391 | 2 | 4 | 3 |
| 0.492598836489373 | 2 | 4 | 4 |
| −0.687829454220912 | 2 | 4 | 5 |
| 0.113870048553631 | 2 | 4 | 6 |
| −0.204150167806019 | 2 | 4 | 7 |
| 0.050750967918305 | 2 | 4 | 8 |
| 0.020241324603485 | 2 | 4 | 9 |
| 0.007258151032643 | 2 | 4 | 10 |
| 0.015132539388435 | 2 | 4 | 11 |
| 0.012293955283122 | 2 | 4 | 12 |
| −2.625356348746880 | 2 | 5 | 1 |
| −1.828177900122070 | 2 | 5 | 2 |
| 2.044661887851670 | 2 | 5 | 3 |
| 0.402579634982466 | 2 | 5 | 4 |
| 0.505732929927158 | 2 | 5 | 5 |
| 0.237359989402324 | 2 | 5 | 6 |
| 0.149894517947836 | 2 | 5 | 7 |
| 0.010645497159941 | 2 | 5 | 8 |
| 0.063956648819820 | 2 | 5 | 9 |
| 0.036202267318351 | 2 | 5 | 10 |
| 0.010182450464961 | 2 | 5 | 11 |
| 0.015953567546020 | 2 | 5 | 12 |
| −0.273262390046030 | 2 | 6 | 1 |
| −0.144091450801287 | 2 | 6 | 2 |
| 0.948944399005048 | 2 | 6 | 3 |
| 0.132676428195866 | 2 | 6 | 4 |
| −0.367019913404405 | 2 | 6 | 5 |
| −0.187261011813669 | 2 | 6 | 6 |
| 0.378529295216396 | 2 | 6 | 7 |
| −0.196849326835218 | 2 | 6 | 8 |
| 0.120926169660651 | 2 | 6 | 9 |
| −0.016595269796411 | 2 | 6 | 10 |
| −0.050055884573419 | 2 | 6 | 11 |
| 0.002884005179932 | 2 | 6 | 12 |
| 0.769941172052730 | 2 | 7 | 1 |
| 0.270433855838665 | 2 | 7 | 2 |
| −1.500626734521690 | 2 | 7 | 3 |
| −0.056818315098472 | 2 | 7 | 4 |
| −0.398582582622571 | 2 | 7 | 5 |
| −0.218739968793262 | 2 | 7 | 6 |
| 0.627209721892102 | 2 | 7 | 7 |
| −0.110772732064056 | 2 | 7 | 8 |
| 0.122434972229655 | 2 | 7 | 9 |
| −0.059197122716249 | 2 | 7 | 10 |
| −0.020193939902945 | 2 | 7 | 11 |
| 0.010659415126615 | 2 | 7 | 12 |
| −1.955298100957190 | 2 | 8 | 1 |
| 1.542846455494360 | 2 | 8 | 2 |
| −1.062660499646170 | 2 | 8 | 3 |
| 0.313674694193646 | 2 | 8 | 4 |
| 0.017256688669322 | 2 | 8 | 5 |
| 0.024241042106396 | 2 | 8 | 6 |
| 0.016900218272744 | 2 | 8 | 7 |
| −0.013762031000162 | 2 | 8 | 8 |
| −0.028876974021786 | 2 | 8 | 9 |
| −0.001611947109104 | 2 | 8 | 10 |
| −0.018246707670756 | 2 | 8 | 11 |
| −0.019045886645274 | 2 | 8 | 12 |

Appendix B

| Connection values | Layer Number | Processing Element Number | Connection Number |
|---|---|---|---|
| 1.006294741010080 | 0 | 1 | 1 |
| −0.814078389787177 | 0 | 1 | 2 |
| −0.704174946155039 | 0 | 1 | 3 |
| 0.657460292760625 | 1 | 1 | 1 |
| 0.708519756311391 | 1 | 1 | 2 |
| −0.585939032574763 | 1 | 1 | 3 |
| 0.367011746500233 | 1 | 1 | 4 |
| −0.552398108812339 | 1 | 1 | 5 |
| 0.995626413733423 | 1 | 1 | 6 |
| 0.104150920641889 | 1 | 1 | 7 |
| −0.874814978948347 | 1 | 1 | 8 |
| 0.197267475802779 | 1 | 2 | 1 |
| −0.776813079900841 | 1 | 2 | 2 |
| −0.640264719557151 | 1 | 2 | 3 |
| 0.660973002147594 | 1 | 2 | 4 |
| −0.950368465935759 | 1 | 2 | 5 |
| −0,257339386523895 | 1 | 2 | 6 |
| −0.202036552852737 | 1 | 2 | 7 |
| −0.909892380811187 | 1 | 2 | 8 |
| −0.165584041403341 | 1 | 3 | 1 |
| 0.276217051349225 | 1 | 3 | 2 |
| −0.582755164487212 | 1 | 3 | 3 |
| 0.182360273044965 | 1 | 3 | 4 |
| 0.166772975218167 | 1 | 3 | 5 |
| 0.639804099534179 | 1 | 3 | 6 |
| 0.273120003777142 | 1 | 3 | 7 |
| 0.000548676362013 | 1 | 3 | 8 |
| −0.376727658900705 | 2 | 1 | 1 |
| 0.748573825234702 | 2 | 1 | 2 |
| −0.487165040096091 | 2 | 1 | 3 |
| 0.409978341373154 | 2 | 1 | 4 |
| −0.703667152731805 | 2 | 1 | 5 |
| 0.521153567307616 | 2 | 1 | 6 |
| −0.666917986426375 | 2 | 1 | 7 |
| −0.946785712823999 | 2 | 1 | 8 |
| 0.584033082280087 | 2 | 1 | 9 |
| 0.520560799466729 | 2 | 1 | 10 |
| −0.788763954445042 | 2 | 1 | 11 |
| −0.710680223566434 | 2 | 1 | 12 |
| −0.246025940361810 | 2 | 2 | 1 |
| 0.852588939628218 | 2 | 2 | 2 |
| 0.306152857694919 | 2 | 2 | 3 |
| −0.467156215860278 | 2 | 2 | 4 |
| −0.092352149763034 | 2 | 2 | 5 |
| −0.987687574746623 | 2 | 2 | 6 |
| −0.939352604623700 | 2 | 2 | 7 |
| 0.187108664741944 | 2 | 2 | 8 |
| 0.419669561334450 | 2 | 2 | 9 |
| −0.039294429270355 | 2 | 2 | 10 |
| 0.752158814055682 | 2 | 2 | 11 |
| −0.259375750700058 | 2 | 2 | 12 |
| −0.149104045022234 | 2 | 3 | 1 |
| 0.599813273366968 | 2 | 3 | 2 |
| −0.479405882009518 | 2 | 3 | 3 |
| 1.033575886215060 | 2 | 3 | 4 |
| 0.710736839510568 | 2 | 3 | 5 |
| 0.684726470906555 | 2 | 3 | 6 |
| −0.500596017518927 | 2 | 3 | 7 |
| −0.150992519846383 | 2 | 3 | 8 |
| 0.877800836884450 | 2 | 3 | 9 |
| 1.021788646619530 | 2 | 3 | 10 |
| −0.190722610400534 | 2 | 3 | 11 |
| 0.987089234435868 | 2 | 3 | 12 |
| −0.548911404538967 | 2 | 4 | 1 |
| 0.839356683147741 | 2 | 4 | 2 |
| 0.037657052818623 | 2 | 4 | 3 |
| −1.088211665061920 | 2 | 4 | 4 |
| 0.202435054653355 | 2 | 4 | 5 |
| 0.989516532459330 | 2 | 4 | 6 |
| 1.119006774899480 | 2 | 4 | 7 |
| −0.183721252916458 | 2 | 4 | 8 |
| 0.783045660643082 | 2 | 4 | 9 |
| 0.440435785738929 | 2 | 4 | 10 |
| 0,937480182727865 | 2 | 4 | 11 |
| 0.602047258276515 | 2 | 4 | 12 |
| −0.590373445243979 | 2 | 5 | 1 |
| 0.831144297076727 | 2 | 5 | 2 |
| 1.099481566228340 | 2 | 5 | 3 |

-continued

Appendix B

| Connection values | Layer Number | Processing Element Number | Connection Number |
|---|---|---|---|
| −1.215254279805010 | 2 | 5 | 4 |
| −0.888564882793841 | 2 | 5 | 5 |
| 1.185909523710110 | 2 | 5 | 6 |
| 1.027764374762670 | 2 | 5 | 7 |
| 0.416973073858034 | 2 | 5 | 8 |
| −0.617181983362963 | 2 | 5 | 9 |
| −0.689103141825156 | 2 | 5 | 10 |
| −0.841441865245580 | 2 | 5 | 11 |
| 0.249522076485670 | 2 | 5 | 12 |
| −1.101577533946540 | 2 | 6 | 1 |
| −0.020909165711846 | 2 | 6 | 2 |
| 0.523438968884704 | 2 | 6 | 3 |
| 0.832232480619633 | 2 | 6 | 4 |
| 1.165780803629070 | 2 | 6 | 5 |
| 0.023813375536295 | 2 | 6 | 6 |
| 1.278212915514820 | 2 | 6 | 7 |
| 0.744851980163933 | 2 | 6 | 8 |
| −0.263760266649300 | 2 | 6 | 9 |
| 0.392317133337400 | 2 | 6 | 10 |
| 0.185529096820330 | 2 | 6 | 11 |
| 0.529598481799822 | 2 | 6 | 12 |
| −1.011767857061450 | 2 | 7 | 1 |
| −0.193293856435798 | 2 | 7 | 2 |
| 0.163047149808400 | 2 | 7 | 3 |
| −0.440535325361939 | 2 | 7 | 4 |
| −1.410213698822820 | 2 | 7 | 5 |
| 1.335160457607640 | 2 | 7 | 6 |
| 0.116797555159225 | 2 | 7 | 7 |
| 1.112452257481490 | 2 | 7 | 8 |
| 1.553768656630990 | 2 | 7 | 9 |
| 0.428448280003481 | 2 | 7 | 10 |
| 0.243283821689201 | 2 | 7 | 11 |
| 1.394139076198660 | 2 | 7 | 12 |
| 1.386555505822190 | 2 | 8 | 1 |
| −0.225694449486863 | 2 | 8 | 2 |
| 1.064189170727070 | 2 | 8 | 3 |
| −0.884218574362244 | 2 | 8 | 4 |
| 1.438631602240010 | 2 | 8 | 5 |
| −1.690624648328520 | 2 | 8 | 6 |
| 0.415404070832278 | 2 | 8 | 7 |
| −0.753010100875778 | 2 | 8 | 8 |
| 1.507243141435640 | 2 | 8 | 9 |
| −0.293189129046769 | 2 | 8 | 10 |
| −1.609635234719700 | 2 | 8 | 11 |
| 1.808434125661330 | 2 | 8 | 12 |

What is claimed is:

1. A nonlinear oscillator, comprising:
a neural network including an internal representation of broad band chaos and comprising a plurality of neural network inputs for simultaneously receiving an m-dimensional input vector, the neural network further including a neural network output for outputting an n-dimensional output vector in response to the m-dimensional input vector; and feed back control means for controlling magnitude and phase of said n-dimensional vector to obtain a modified output vector and for storing a plurality of samples of the modified output vector at selected taps of m delay lines and for applying an outside signal to said m delay lines to get said oscillator started to oscillate.

2. A nonlinear oscillator as set forth in claim 1 wherein said feedback control means is connected between the output of the neural network and the input of said neural network, the feedback control means receiving the n-dimensional output vector generated by the neural network and in response generating the modified output vector by modifying a magnitude and/or a polarity of the n-dimensional output vector generated by the neural network, samples of the modified output vector generated by the feedback control means being stored at selected taps of said m delay lines.

3. A nonliner oscillator as set forth in claim 2 wherein a time difference between two stored samples is equal to at least a summation of a delay time of the neural network and a delay time of the feedback network means.

4. A neural network as set forth in claim 2 wherein said feedback control means comprises an input for receiving a forcing function comprising a momentary multi-dimensional vector, and wherein the output modified output vector generated by said feedback control means is further a function of the forcing function.

5. A nonlinear oscillator as set forth in claim 1 wherein the neural network is comprised of a plurality of layers, comprising an input layer, an output layer, and at least one hidden layer, each of said plurality of layers comprising at least one processing element, and wherein an output of each said processing element of the input layer and the hidden layer are connected to an input of at least one processing element of another layer, thus forming a plurality of associated weights representing a plurality of connections between processing elements of said plurality of layers.

6. A neural network as set forth in claim 5 wherein a strength of a connection between two processing elements is a function of an associated weight, and wherein each said weight is trained on a deterministic sequence of data from a broadband chaotic source.

7. A neural network as set forth in claim 5 wherein a strength of a connection between two processing elements is a function of an associated weight, and wherein each said weight is a representation of a strange attractor.

8. A neural network as set forth in claim 5 wherein a strength of a connection between two processing elements is a function of an associated weight, wherein each of the weights is a representation of a stochastic process, and wherein each of said plurality of weights is randomly selected.

9. A neural network as set forth in claim 5 wherein a strength of a connection between two processing elements is a function of an associated weight, wherein each of said plurality of weights is trained with a representation of a nonlinear system thereby enabling the neural network to emulate nonlinearities of the nonlinear system.

10. A nonlinear oscillator, comprising:
a neural network having at least one output for outputting a one dimensional vector, the neural network including a plurality of layers, including an input layer, an output layer, and at least one hidden layer, each of the layers including at least one processing element, wherein an output of each said processing element of the input layer and the hidden layer is connected to an input of at least one processing element of another layer, wherein the input layer has an input coupled to the at least one output and includes an analog delay line means having a plurality of taps each of which outputs a time-delayed sample of the one dimensional output vector, each of the taps being connected to each one of the processing elements of the at least one hidden layer for providing a sample at one of the taps of at least one of said m delay lines.

11. A nonlinear oscillator as set forth in claim 10 and further comprising feedback control means that is connected between the output of the neural network and the input of the input layer for modifying a magnitude and/or a polarity of the one dimensional output vector prior to the sample of the one dimensional output vector being applied to the input of the analog delay line means.

12. A nonlinear oscillator as set forth in claim 11 wherein the feedback control means comprises an input for receiving a forcing function, and wherein the output of the feedback network means is a function of the forcing function.

13. A nonlinear oscillator as set forth in claim 10 wherein the nonlinear oscillator is a component of a noise source, and wherein the at least one output is a deterministic noise signal.

14. A nonlinear oscillator as set forth in claim 10 wherein the nonlinear oscillator is a component of a musical source, and wherein the at least one output generates a musical tone comprising an associated timbre.

15. A nonlinear oscillator as set forth in claim 10 wherein the nonlinear oscillator is a component of an information storage system, and wherein stored information is represented in the form of deterministic dynamic limit cycles at the at least one output, each deterministic limit cycle representing a remembrance in the form of an activation pattern of the nonlinear oscillator.

16. A nonlinear oscillator as set forth in claim 10 wherein the nonlinear oscillator is coupled to a second neural network for training the second neural network to become a copy of the neural network of the nonlinear oscillator.

17. A vector converter comprising at least one output providing a first one dimensional vector in response to a first input vector and providing a second one dimensional vector in response to a second input vector, wherein the first one dimensional output vector differs from the second one dimensional vector by an amount that is greater than an amount that the first input vector differs from the second input vector, the vector converter comprising:

a neural network including an input layer for receiving the input vectors, an output layer for outputting the at least one output, and at least one hidden layer, each said hidden layer including at least one processing element, wherein an output of each said processing element of the input layer and the hidden layer are connected to an input of at least one processing element of another layer, and wherein a strength of a connection between two processing elements is a function of an associated weight, each said weight being trained on a deterministic sequence of data from a broadband chaotic source.

18. Apparatus for copying representations from a first set of connection weights within a first neural network into a second set of connection weights of a second neural network, comprising:

a nonlinear oscillator comprising the first neural network, the first neural network having a plurality of inputs for simultaneously receiving a m-dimensional input vector, the first neural network further including an output for outputting an n-dimensional output vector in response to the m-dimensional input vector, said nonlinear oscillator further comprising means, having an input coupled to the output of the first neural network, for storing a plurality of samples of the n-dimensional output vector, the storing means having a plurality of outputs individual ones of which are coupled to an individual one of the plurality of inputs of the first neural network and also to an individual one of a plurality of inputs of the second neural network for providing a selectively-variable time-delayed sample of the n-dimensional output vector to each of the first and the second neural networks;

differencing means having a first input coupled to the output of the first neural network and a second input coupled to an output of the second neural network, said differencing means having an output for expressing a difference signal indicative of a difference between the output of the first neural network and the output of the second neural network; and weight adjustment means, having an input coupled to the output of the differencing means, for adjusting the second set of connection weights of the second neural network so as to minimize, for a given m-dimensional input vector, a magnitude of the difference signal.

19. Apparatus as set forth in claim 18 and further comprising feedback network means that is connected between the output of the first neural network and the storing means for modifying a magnitude and/or a polarity of the n-dimensional output vector.

* * * * *